United States Patent [19]

Poux et al.

[11] Patent Number: 5,082,418
[45] Date of Patent: Jan. 21, 1992

[54] SYSTEM FOR AUTOMATICALLY LOADING AND UNLOADING ARTICLES COUPLED BY CABLING

[75] Inventors: Christopher J. Poux, Trenton; Donald P. Sinkus, Hamilton Square, both of N.J.

[73] Assignee: Thomson Consumer Electronics, Inc., Indianapolis, Ind.

[21] Appl. No.: 498,799

[22] Filed: Mar. 26, 1990

[51] Int. Cl.[5] ............................................. B25J 15/06
[52] U.S. Cl. .................................... 414/736; 29/771; 294/64.1; 414/737; 414/772; 901/40
[58] Field of Search ............... 414/736, 737, 735, 416, 414/685, 744.2, 606, 607, 622, 623, 659, 660, 661, 751, 752, 772, 665, 666, 669, 670; 294/2, 64.1, 82.28, 94; 29/771, 784, 787; 198/468.4, 468.6; 901/40

[56] References Cited

U.S. PATENT DOCUMENTS

| | | | |
|---|---|---|---|
| 4,293,272 | 10/1981 | Jellema | 294/2 X |
| 4,354,703 | 10/1982 | Schmidt et al. | 294/64.1 |
| 4,789,295 | 12/1988 | Boucher, Jr. et al. | 414/607 X |
| 4,934,624 | 6/1990 | Grollimund et al. | 414/736 X |

FOREIGN PATENT DOCUMENTS

| | | | |
|---|---|---|---|
| 1102639 | 3/1961 | Fed. Rep. of Germany | 294/82.28 |
| 131480 | 2/1960 | U.S.S.R. | 294/2 |

Primary Examiner—David A. Bucci
Assistant Examiner—Donald W. Underwood
Attorney, Agent, or Firm—J. S. Tripoli; D. H. Irlbeck; L. L. Hallacher

[57] ABSTRACT

An apparatus for transferring a kinescope and a chassis, which are coupled by cabling, from one location to another includes probes which engage apertures in the chassis to pick up the chassis. A frame supports suction cups to pick up the kinescope. The probes are supported by a bar which is pivotably attached to the frame. The chassis and kinescope are thus separately engaged and released but are simultaneously moved.

4 Claims, 3 Drawing Sheets

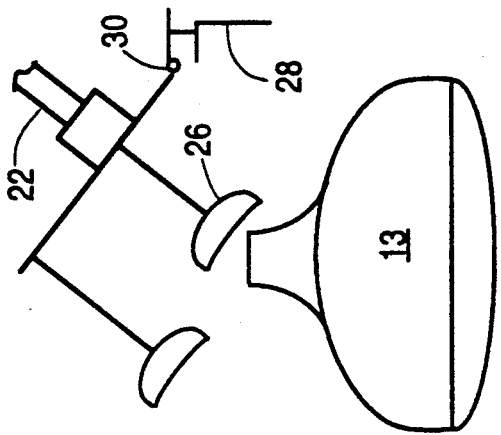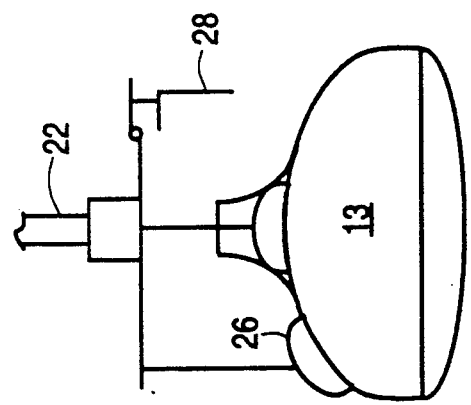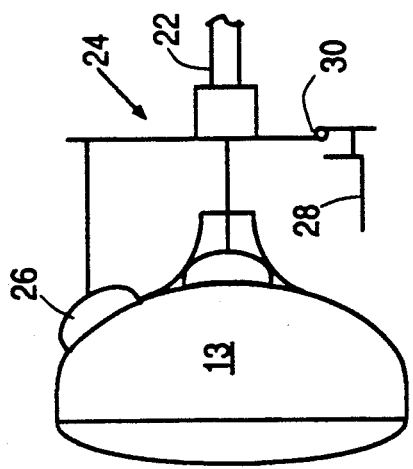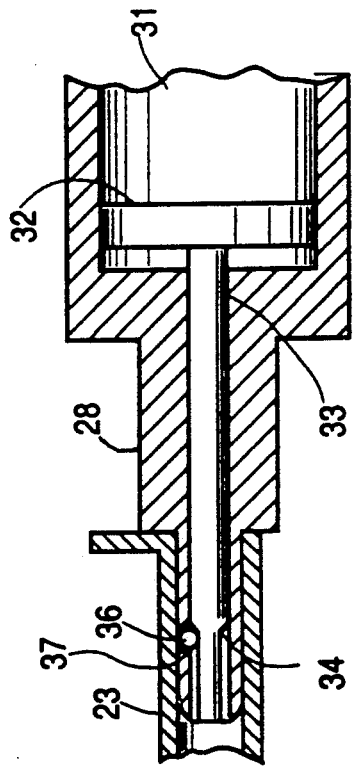

SYSTEM FOR AUTOMATICALLY LOADING AND UNLOADING ARTICLES COUPLED BY CABLING

BACKGROUND

This invention relates generally to a system for automatically loading and unloading articles which are joined together by a flexible member and particularly to such a system for loading and unloading television kinescopes and chassis coupled by cabling.

Automation of the manufacture and assembly of television receivers is very common and is increasing at a rapid rate. At the same time, the use of solid state circuitry has reduced the size of the electronic components to such a small size that the picture tube is the largest component of the television receiver. Typically, in the assembly process the kinescope and the chassis are attached by cabling prior to being placed into the cabinet in which they are ultimately mounted. The cable connected chassis and kinescopes are tested prior to being placed into cabinets in order to ensure the operability of all components and avoid the expense of assembling inoperative components. Accordingly, typically the kinescopes and chassis move along an assembly line where they are tested, for example, and must be transferred to a line where they are placed and permanently mounted into the cabinets. Because the kinescopes and chassis are coupled by cabling they must be separately engaged and released but simultaneously moved. This presents a unique problem for automatically unloading the articles from one conveyor and loading them onto another. There are many sizes of tubes and chassis and an ideal transfer device should be able to handle all sizes without the need for tooling changes. The present invention solves these problems.

SUMMARY

Apparatus for transferring a kinescope and a chassis, having pickup apertures arranged at a preselected spacing, from one location to another location, includes a robot driven pickup member having a plurality of pickup probes arranged at the preselected spacing for engaging the pickup apertures and moving the chassis. A frame has cups for picking up the kinescope as the probes engage the apertures.

BRIEF DESCRIPTION OF THE DRAWINGS

FIGS. 3a, 3b, and 3c a are simplified showings of the motions of the preferred embodiment of FIG. 2.

FIG. 5 is a cross section of a pickup probe useful with the preferred embodiment of FIG. 2.

DETAILED DESCRIPTION

Figure 1:
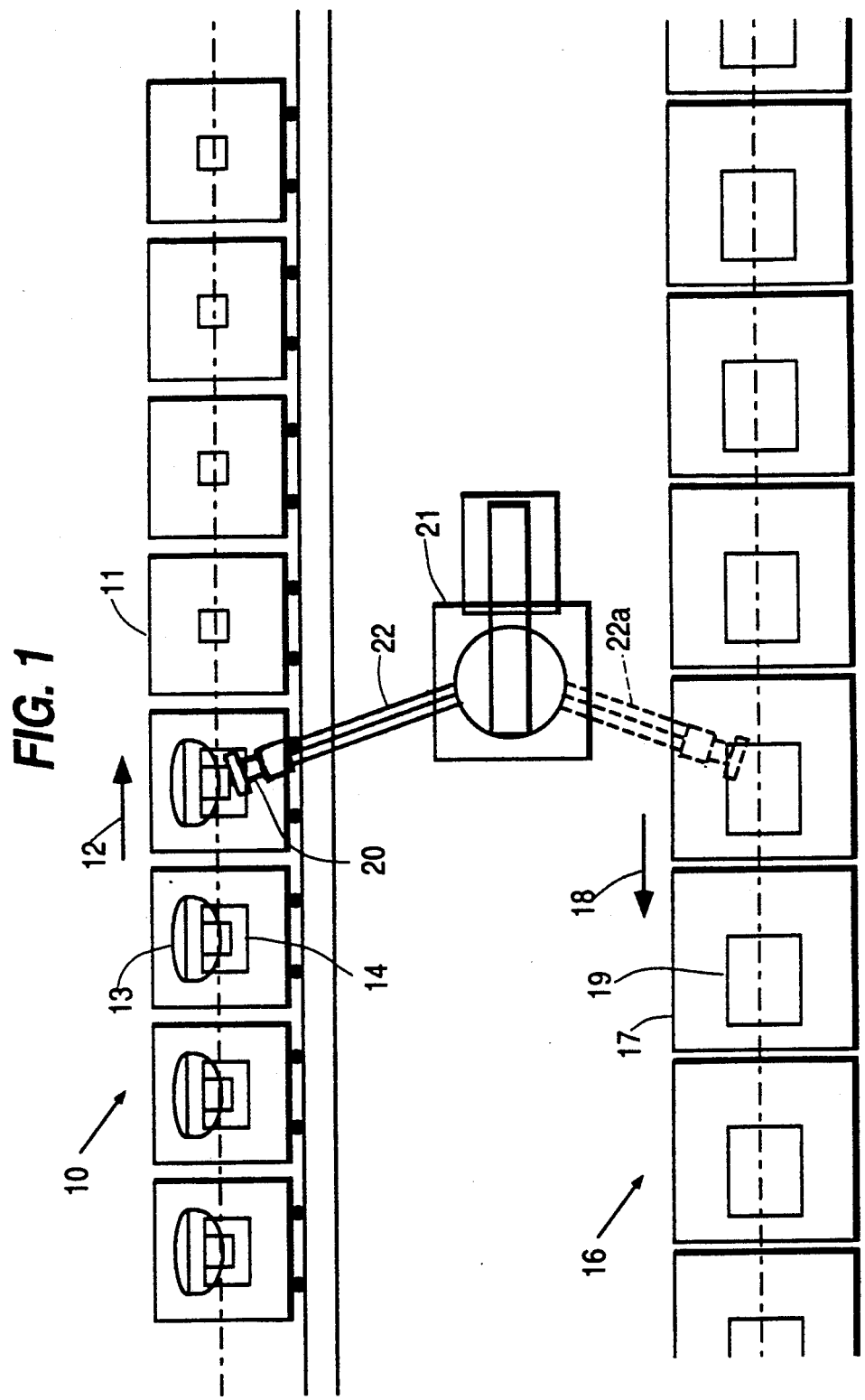
FIG. 1 is a simplified showing of kinescopes and chassis being moved from one conveyor to another.

In FIG. 1, a delivery conveyor 10 includes a plurality of carriers 11 which incrementally move in the direction indicated by the arrow 12. Each of the carriers 11 carries a kinescope 13 and a chassis 14 which are joined together by cabling, now shown, but which applied the signals to the yoke and the electron gun of the tube 13. The carriers 12 stop at a preset location and the chassis 14 are precisely located on the carriers so that the position of the chassis and kinescopes are known when the carrier stops at the preselected location.

A receiving conveyor 16 includes a plurality of carriers 17 which incrementally move in the direction indicated by the arrow 18. Each of the carriers 17 supports a cabinet 19 into which a kinescope 13 and a chassis 14 are to be inserted. The carriers 17 therefore also incrementally move along the conveyor 16 and are stopped at a preselected location so that the exact position of the cabinet 19 is known when the conveyor stops.

A transfer mechanism 21 includes a rotatable arm 22 which rotates from a pickup position along conveyor 10, to a delivery position (shown in phantom) along the conveyor 16 to deliver a kinescope 13 and a chassis 14 and insert them into the cabinet 19. The transfer mechanism 21, conveyors 10 and 16 and the carriers 11 and 17 are all of a type well known in the art and many available can be used. The invention is directed to the apparatus 20 which is provided on the end of arm 22 which permits the kinescope 13 and chassis 14 which are loosely connected by cabling to be simultaneously picked up from the carriage 11 and moved to a carriage 17 and accurately positioned in the cabinet 19.

Figure 4:
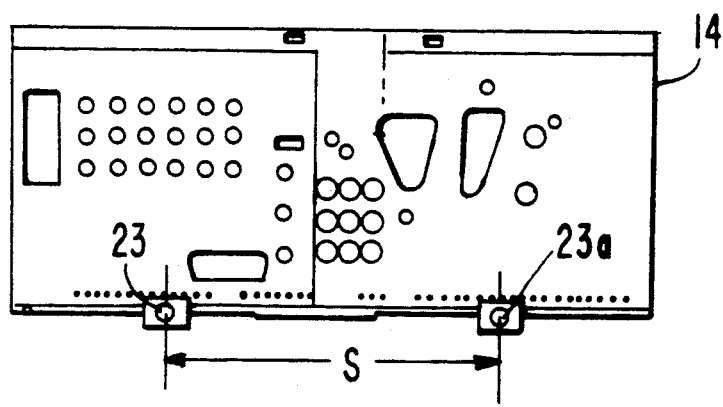
FIG. 4 shows the back of a typical television receiver useful with the preferred embodiment of FIG. 2.

FIG. 4 shows the back of a chassis 14 which can vary for different sizes and models of television receivers. However, two pickup apertures 23 and 23a are spaced by distance S and are provided in the back of the chassis for the specific purpose of providing a means for picking up the chassis 14 and transporting it to another location. As shown in FIG. 5, the apertures 23 and 23a are in the nature of tubes, or cylinders, which extend some distance along the bottom of the chassis 14 in a parallel relationship.

Figure 2:
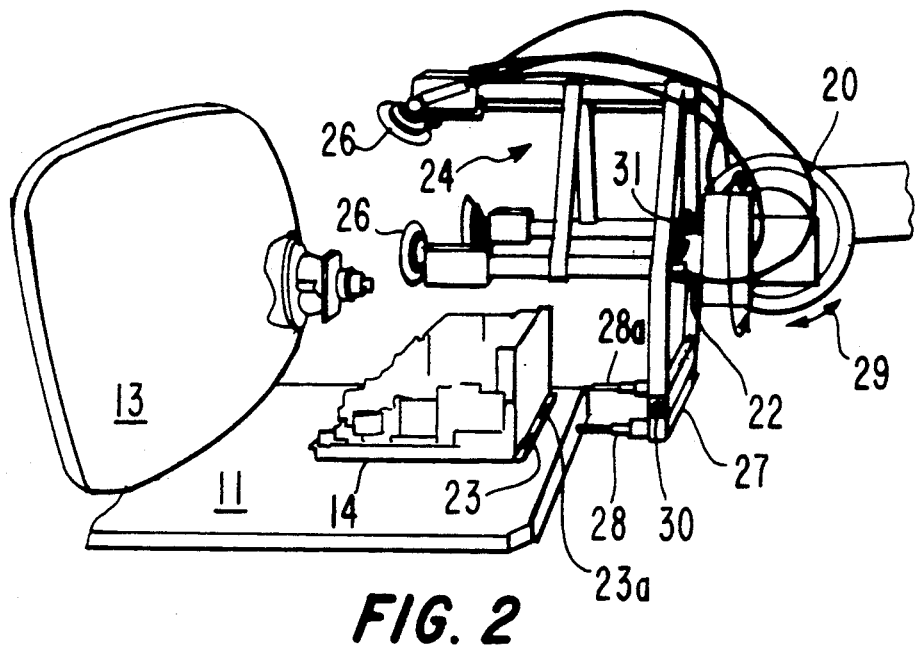
FIG. 2 is a preferred embodiment of the present invention.

In FIG. 2 the inventive apparatus includes a frame 24, having a plurality of suction cups 26 which serve as a means for picking up the kinescope 13 from the carrier 11. A bar 27 is pivotably coupled to frame 24 and supports pickup probes 28 and 28a which are spaced at the same preselected distance S as the apertures 23 and 23a of chassis 14. The pickup probes 28 and 28a are aligned with the pickup apertures 23, 23a of the chassis 14 which also rests on the carriage 11.

In operation the frame 24 is moved inwardly toward the tube 13 and chassis 14. The probes 28, 28a enter the apertures 23, 23a within chassis 14 to enable the chassis to be picked up. Simultaneously, the suction cups 26 engage the kinescope 13 in various strategic locations on the funnel of the tube to pick up the tube. The details of probes 28, 28a are described hereinafter with respect to FIG. 5.

As indicated by arrows 29 and 31, the frame is rotatable in two orthogonal directions. FIGS. 3a to 3c are useful in understanding the sequence of motion as a tube and chassis are transferred from a delivery carrier 11 to a receiving carrier 17. FIG. 3a shows the condition when the suction cups 26 and the probes 28 initially engage a kinescope 13 and a chassis 14 respectively. After both of the members which are being picked up are engaged, the arm 22 is raised slightly to lift the member off of the carrier 11 and the arm 22 is rotated to place the kinescope and chassis above the receiving carrier 17. During the travel from the carriage 11 to the carrier 17, the frame 14 is rotated in the direction indicated by arrow 29 in FIG. 2 to face downwardly, as shown in FIG. 3b. The cabinet in which the tube and chassis are to be placed is arranged face down on the receiving carrier 17. Mounting lugs, which are present on the kinescope 13 (but which are not shown in the FIGURES) engage mounting bolts provided in the cabinet to mount the tube. Also, the chassis 28 is placed over mounting members (not shown), which are available in the receiving cabinet 19. To separately disengage the kinescope 13 and chassis 14 from the frame 24 and probes 28, 28a the suction cups 26 are released by pivoting the frame 24 about a pivot point 30, as shown in FIG. 3c, while the probes 28 remain engaged with the apertures 23 of the chassis 14. Subsequently the entire frame is moved upwardly vertically to disengage the probes 28 from the apertures 23. The conveyor 16 is then incremented to move another cabinet 19 into the preselected position in preparation of the reception of another tube and chassis while the previously loaded tube and chassis continue to a subsequent work station where, for example, bolts are applied to the mounting lugs and the chassis is permanently mounted in the cabinet.

All motions of the frame 24 are independent of the size of the kinescope 13 and chassis 14. Accordingly, by spacing the apertures 28 and 28a at same spacing S for all receiving styles and sizes a mix of receivers can be transferred from conveyor 10 to conveyor 16 without the need to change any of the tooling associated with the arm 22. Obviously, the correct cabinet must be properly placed on the receiving conveyor 16; however, this is well within the state of the art.

FIG. 5 is a cross sectional view of the probes 28 and 28a. Probe 28 includes a cylinder portion 31 which preferably is an air cylinder having an internal piston 32 upon which a shaft 33 is centered. The piston 32 thus moves back and forth in the cylinder 31 in the same manner as is well known for air and hydraulic cylinders. Shaft 33 has a beveled portion 34 and a ball 36 is supported in an internal hole 37, which is arranged toward the end of the probe 28 to cause the ball to enter into the cylindrical aperture 23 of the chassis 14. When piston 32 is actuated to move inwardly the bevel 34 engages the ball 36 and presses the ball against the inside of the aperture 23 resulting in an interference fit and permitting the chassis to be supported facing downwardly in the position shown in FIGS. 3b and 3c.

What is claimed is:

1. Apparatus for transferring a kinescope and a chassis attached by cabling from one location to another location, said chassis having a back panel and pickup apertures arranged at a preselected spacing in said panel, said apparatus including a robot driven pickup member comprising:
   a plurality of pickup probes spaced at said preselected spacing for engaging said pickup apertures and moving said chassis;
   a frame, said probes pivotably coupled to said frame, said frame having means for picking up said kinescope as said probes engage said apertures; and
   means for supporting and simultaneously rotating said frame in orthogonal directions.

2. The apparatus of claim 1 wherein said means for picking up includes a plurality of suction cups arranged to engage said kinescope at several locations.

3. The apparatus of claim 1 wherein said pickup probes include means for engaging said pickup apertures with an interference fit.

4. The apparatus of claim 1 wherein said pickup probes are supported by a bar and wherein said bar is pivotably coupled to said frame.

* * * * *